United States Patent
Klingbeil et al.

(10) Patent No.: US 11,643,963 B2
(45) Date of Patent: May 9, 2023

(54) METHODS AND SYSTEMS FOR ELECTRIC TURBOCHARGER CONTROL

(71) Applicant: Transportation IP Holdings, LLC, Norwalk, CT (US)

(72) Inventors: Adam Edgar Klingbeil, Ballston Lake, NY (US); Roy James Primus, Williamsburg, VA (US); Thomas Michael Lavertu, Ballston Lake, NY (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 17/448,342

(22) Filed: Sep. 21, 2021

(65) Prior Publication Data

US 2023/0090173 A1 Mar. 23, 2023

(51) Int. Cl.
*F02B 37/04* (2006.01)
*F02B 37/12* (2006.01)
*F02B 39/10* (2006.01)
*F01N 5/04* (2006.01)
*F02D 29/06* (2006.01)
*H02K 7/00* (2006.01)
*H02K 7/18* (2006.01)
*F02D 23/00* (2006.01)

(52) U.S. Cl.
CPC ............... *F02B 37/12* (2013.01); *F01N 5/04* (2013.01); *F02B 37/04* (2013.01); *F02B 39/10* (2013.01); *F02D 23/00* (2013.01); *F02D 29/06* (2013.01); *H02K 7/003* (2013.01); *H02K 7/1823* (2013.01); *F02D 2200/025* (2013.01)

(58) Field of Classification Search
CPC .. F01N 5/04; F02B 37/04; F02B 37/12; F02B 39/10; F02D 23/00; F02D 41/0007; F02D 29/06; F02D 2200/025; H02K 7/003; H02K 7/1823; Y02T 10/12; Y02T 10/40
See application file for complete search history.

(56) References Cited

U.S. PATENT DOCUMENTS

| | | | |
|---|---|---|---|
| 2019/0234272 A1* | 8/2019 | Harmsen | F02M 26/04 |
| 2020/0173344 A1* | 6/2020 | Punjani | F02B 37/12 |
| 2020/0224614 A1* | 7/2020 | Hu | F02B 37/10 |
| 2020/0271046 A1* | 8/2020 | Kelly | F02B 37/10 |

\* cited by examiner

*Primary Examiner* — Audrey B. Walter
*Assistant Examiner* — Dapinder Singh
(74) *Attorney, Agent, or Firm* — McCoy Russell LLP

(57) ABSTRACT

Various methods and systems are provided for controlling air flow through an engine by adjusting an electric turbocharger of a vehicle. In one embodiment, a system for a vehicle comprises an electric turbocharger comprising a compressor, an exhaust turbine coupled to the compressor via a shaft, and an electric machine mechanically coupled to the shaft; and a controller including a processor and instructions stored on a non-transient memory of the controller that, when executed, cause the controller to: adjust an amount of power provided to or extracted from the shaft by the electric machine based on at least one of a speed of the electric turbocharger, a cylinder pressure, and an exhaust gas temperature. By adjusting the amount of power provided to or extracted from the electric machine, the exhaust gas temperature and the speed of the electric turbocharger may be efficiently maintained within a desired operating range.

15 Claims, 4 Drawing Sheets

METHODS AND SYSTEMS FOR ELECTRIC TURBOCHARGER CONTROL

TECHNICAL FIELD

Embodiments of the subject matter disclosed herein relate to turbocharged internal combustion engines.

DISCUSSION OF ART

Some vehicles with an internal combustion engine (also referred to simply as an engine) may use a turbocharger. One type of turbocharger is an electric turbocharger, also referred to herein as an "E-turbo." The E-turbo differs from a regular turbocharger in that it may selectively extract energy from the flow of exhaust gases via an electric machine. On one hand, a turbine that is coupled to the electric machine may extract electrical energy. On the other hand, the exhaust gas flow may power a compressor turbine to provide compressed air to one or more cylinders of the engine. Compressing air in this manner may increase a power and torque of the engine. Further, the electric machine may be operated as a motor to apply power to the shaft to increase the compressed air provided to the engine.

BRIEF DESCRIPTION

In one embodiment, the current disclosure provides for a system for a vehicle, comprising an electric turbocharger comprising a compressor, an exhaust turbine coupled to the compressor via a shaft, and an electric machine mechanically coupled to the shaft; and a controller including a processor and instructions stored on a non-transient memory of the controller that, when executed, cause the controller to: adjust an amount of power provided to or extracted from the shaft by the electric machine based on at least one of a speed of the electric turbocharger, a cylinder pressure, and an exhaust gas temperature. For example, the amount of power provided to the shaft by the electric machine may be increased in response to the exhaust gas temperature increasing above an upper threshold temperature while the speed of the electric turbocharger is less than a threshold speed and the cylinder pressure is less than a threshold pressure. As another example, the amount of power provided to the shaft by the electric machine may be decreased in response to at least one of the exhaust gas temperature decreasing below a lower threshold temperature, the cylinder pressure increasing above the threshold pressure, and the speed of the electric turbocharger increasing above the threshold speed. As a further example, the amount of power extracted from the shaft by the electric machine may be increased in response to at least one of the exhaust gas temperature decreasing below the lower threshold temperature and the speed of the electric turbocharger increasing above the threshold speed, he cylinder pressure increasing above the threshold pressure, and the amount of power extracted from the shaft by the electric machine may be decreased in response to the exhaust gas temperature increasing above the upper threshold temperature while the speed of the electric turbocharger is less than the threshold speed.

By adjusting the amount of power provided to or extracted from the shaft by the electric machine based on at least one of the speed of the electric turbocharger, the cylinder pressure, and the exhaust gas temperature, an efficiency of the system may be increased while exhaust gas emissions are decreased. For example, the energy extracted by the electric machine may be harvested by the vehicle for a fuel benefit and/or an amount of energy wasted as exhaust heat may be recovered. An additional benefit is that a rate of degeneration of one or more components of an exhaust system of the vehicle may be lowered.

BRIEF DESCRIPTION OF THE DRAWINGS

The present invention will be better understood from reading the following description of non-limiting embodiments, with reference to the attached drawings, wherein below.

DETAILED DESCRIPTION

This description and embodiments of the subject matter disclosed herein relate to methods and systems for increasing a performance of an internal combustion engine (ICE) of a vehicle. Methods and systems according to various embodiments may control a temperature of exhaust gases generated by the engine, a pressure within cylinders of the engine, and a shaft speed of an E-turbo of the vehicle via an electric machine of the E-turbo. By using the E-turbo to control the temperature of the exhaust gases, the exhaust gases may be maintained within an efficient temperature range for operating an aftertreatment system and for a turbine of the E-turbo. Additionally, the E-turbo may be controlled to maintain a shaft of the E-turbo below a speed above which may reduce a useful lifetime of the shaft. Furthermore, the E-turbo may be used to control a pressure of the cylinders within the engine, and by doing so, may increase an efficiency and lifetime of the engine.

Engine systems according to embodiments disclosed herein may be suitable for use in mobile applications and stationary applications. Suitable stationary applications may include stationary power generation applications. Suitable mobile applications may include vehicles. Suitable vehicles may be used in the rail, mining, marine, aviation, trucking, automotive, and other industrial and agricultural market segments. A locomotive for the rail market is used herein for illustration purposes. A suitable rail market may use a locomotive for mainline freight haulage, passenger rail, switchers, shunters, and the like.

Figure 1:
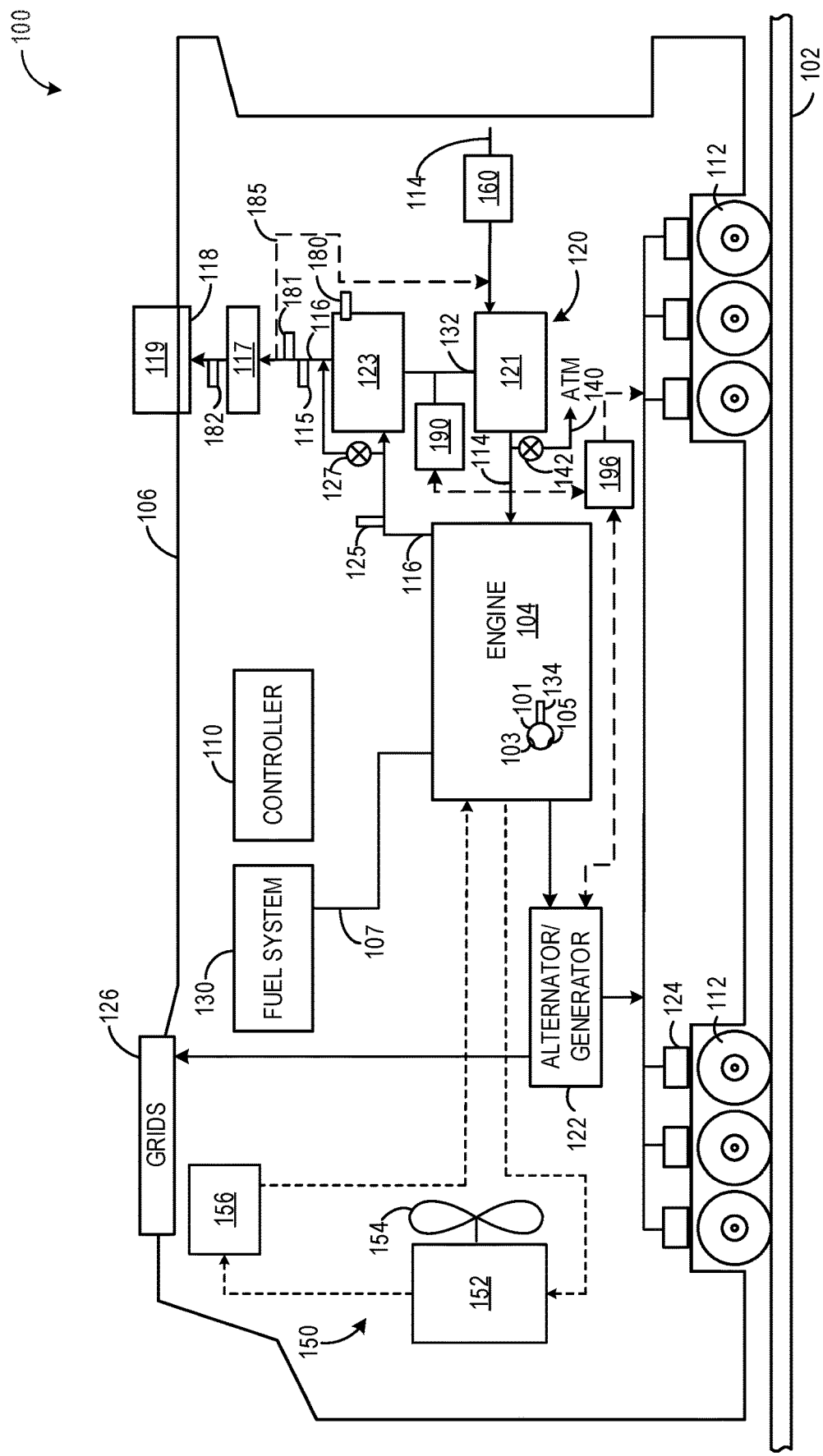
FIG. 1 shows a schematic diagram of a vehicle system with an engine, according to an embodiment of the present disclosure.

FIG. 1 illustrates an example of a vehicle system that includes an engine, an E-turbo, an aftertreatment system, a fuel system, and a control system. A controller of the vehicle system may use an E-turbo control strategy to adjust a speed of an E-turbo shaft, an exhaust gas temperature, and/or a cylinder pressure based at least in part on engine operating conditions. The control strategy may be used to maximize an efficiency of the vehicle system while increasing component lifetime and is shown FIG. 2. Additionally, an exemplary timeline for adjusting the E-turbo to control the E-turbo shaft speed, the exhaust gas temperature, and the cylinder pressure is shown in FIGS. 3A and 3B.

Referring to FIG. 1, a block diagram of an embodiment of a vehicle system 100 (e.g., an engine system) is shown, including a vehicle 106. In the illustrated embodiment, the vehicle is a rail vehicle (e.g., a locomotive) that may operate on a rail 102 via a plurality of wheels 112. In another embodiment, the vehicle system may be disposed in a vehicle such as an automobile or a truck. In still other embodiments, the vehicle system may include mining equipment, agricultural equipment, industrial equipment, or any other equipment that relies on tractive effort generated by a combination of one or more engines and one or more motors.

The vehicle system includes an engine 104. The engine includes a plurality of cylinders 101 (where one representative cylinder is shown in FIG. 1) that each include at least one intake valve 103, at least one exhaust valve 105, and at least one fuel injector 134. The cylinder may also be referred to herein as a combustion chamber. Each fuel injector may include an actuator that may be actuated via a signal from a controller 110 of the engine. The cylinders of the engine may receive fuel (e.g., diesel fuel) from a fuel system 130 via a fuel conduit 107. In some examples, the fuel conduit may be coupled with a common fuel rail and a plurality of fuel injectors.

During operation, each cylinder within the engine may use a four-stroke cycle. The four-stroke cycle includes an intake stroke, a compression stroke, an expansion stroke, and an exhaust stroke. During the intake stroke, generally, the exhaust valve closes and the intake valve opens. Air is introduced into the combustion chamber via the intake manifold, and the piston moves to the bottom of the cylinder so as to increase the volume within the combustion chamber. The position at which the piston is near the bottom of the cylinder and at the end of its stroke (e.g., when the combustion chamber is at its largest volume) is typically referred to by those of skill in the art as bottom dead center (BDC). During the compression stroke, the intake valve and the exhaust valve are closed. The piston moves toward a cylinder head of the cylinder so as to compress the air within the combustion chamber. The point at which piston is at the end of its stroke and closest to the cylinder head (e.g., when the combustion chamber is at its smallest volume) is typically referred to by those of skill in the art as top dead center (TDC). In a process hereinafter referred to as direct injection, fuel is introduced into the combustion chamber. In some examples, fuel may be injected to a cylinder a plurality of times during a single cylinder cycle. In a process hereinafter referred to as ignition, the injected fuel is ignited by compression ignition, resulting in combustion. During the expansion stroke, the expanding gases push the piston back to BDC. A crankshaft of the engine converts piston movement into a rotational torque of the rotary shaft. Finally, during the exhaust stroke, the exhaust valve opens to release the combusted air-fuel mixture to the exhaust manifold and the piston returns to TDC. Note that the above is described merely as an example, and that intake and exhaust valve opening and/or closing timings may vary, such as to provide positive or negative valve overlap, late intake valve closing, or various other examples. For example, a timing of the opening and/or closing of the intake and/or exhaust valves may be advanced to reduce a temperature of exhaust gases entering an aftertreatment system of the vehicle system or to increase an efficiency of the aftertreatment system. Further, in some examples a two-stroke cycle may be used rather than a four-stroke cycle.

The engine may receive intake air for combustion from an intake passage 114. The intake air includes ambient air from outside of the vehicle flowing into the intake passage through an air filter 160. The intake passage may include and/or be coupled to an intake manifold of the engine. Exhaust gas resulting from combustion in the engine is supplied to an exhaust passage 116. Exhaust gas flows through the exhaust passage, to a muffler 118, and out of an exhaust stack 119 of the vehicle.

In one example, the vehicle is a diesel-electric vehicle, where the engine may be coupled to an electric power generation system, including an alternator/generator 122 and electric traction motors 124. The alternator/generator may additionally include a direct current (DC) generator. In other examples, the engine may be a diesel engine, a gasoline engine, a biodiesel engine, an alcohol or hydrogen engine, a natural gas engine (spark or compression ignition), or a combination of two or more of the foregoing that generates a torque output during operation. The torque output may be transmitted to the electric generator or alternator (e.g., the alternator/generator) through a mechanical coupling from the engine. As depicted herein, six pairs of traction motors correspond to each of six pairs of motive wheels of the vehicle. In another example, the alternator/generator may be coupled to one or more resistive grids 126 or an energy storage device. The resistive grids may dissipate excess engine torque and/or electricity generated by traction motors in dynamic braking mode via heat produced by the grids from generated electricity. The energy storage device may be used to capture dynamic braking energy, or from the generator directly, or from any one of a number of selectively couplable sources of electricity (and conversely may pay out energy as may be useful).

Further, the alternator/generator produces electrical power that may be stored (such as in a battery) and/or applied for subsequent propagation to a variety of downstream electrical components. In one example, the alternator/generator may be coupled to an electrical system, which may include one or more electrical loads configured to run on electricity generated by the alternator/generator, such as vehicle headlights, a cabin ventilation system, and an entertainment system, and may further include an energy storage device 196 (e.g., a battery) configured to be charged by electricity generated by the alternator/generator.

The vehicle system may include a turbocharger 120 that may be arranged between the intake passage and the exhaust passage. The turbocharger increases an air charge of ambient air drawn into the intake passage in order to provide a greater charge density during combustion to increase a power output and/or engine-operating efficiency. The turbocharger may include a compressor 121 (disposed in the intake passage), which may be at least partially driven by a turbine 123 (disposed in the exhaust passage, also referred to as an exhaust turbine) via a shaft 132 that mechanically couples the compressor and the turbine. The turbine may be a fixed geometry turbine, or the turbine may be a variable geometry turbine (VGT), where a variable vane control adjusts a position of variable geometry turbine vanes. Exhaust gases may pass through the turbine supplying little energy to rotate the turbine when vanes are in an open position, while exhaust gases may pass through the turbine and impart increased force on the turbine when vanes are in a closed position. As the turbine rotates, heat and kinetic energy in the exhaust gases may be converted into mechanical energy, which may be used to drive the compressor of the turbocharger to deliver compressed air to the engine intake (e.g., to provide a pressure boost to cylinders of the engine based on engine operating conditions). While a single turbocharger is included in FIG. 1, the system may include multiple turbine and/or compressor stages. The turbine may include a turbine speed sensor 180, and a turbine inlet temperature sensor 125 may be positioned in the exhaust passage, upstream of an inlet of the turbine. The speed of the shaft may be estimated by the turbine speed sensor, as the turbine and the shaft may rotate at a same speed.

In the depicted embodiment, the turbocharger is an electric turbocharger or E-turbo, where an electric machine 190 is mechanically coupled to the turbine. The electric machine may convert the mechanical energy of the turbocharger (e.g., kinetic energy) into electrical energy while in a generating mode or may convert electrical energy to mechanical energy while in a motoring mode. The electric machine may be integrated into the shaft of the turbocharger or may be mechanically coupled to the turbocharger in another manner. For example, a rotor of the electric machine may be positioned on, or rotationally coupled to, the shaft of the turbocharger. The electric machine may be operated as a motor to increase a speed of the shaft and increase a work output of the compressor or as a generator to decrease the speed of the shaft and decrease the work output of the compressor. Thus, the E-turbo allows the compressor to be controlled independently of the exhaust gas flow through the turbine, thereby increasing an efficiency of the compressor and the engine. For example, extracting the excess exhaust energy by operating in the generating mode may result in increased overall engine efficiency. As another example, the compressor may provide additional airflow to the engine while operating in the motoring mode, which may increase a power output of the engine and/or decrease emissions of the vehicle. Additionally, the electrical energy generated by the electric machine in the generating mode may be used to power one or more accessory devices of the vehicle, power the traction motors propelling the vehicle, and/or stored in the energy storage device.

The vehicle system may also include a compressor bypass passage 140 coupled directly to the intake passage, downstream of the compressor and upstream of the engine. In one example, the compressor bypass passage may be coupled to the intake passage, in fluid communication with the intake manifold of the engine. The compressor bypass passage may be configured to divert airflow (e.g., from after the compressor outlet) away from the engine (or intake manifold of the engine) and to atmosphere. A compressor bypass valve (CBV) 142 may be positioned in the compressor bypass passage and may include an actuator that may be controlled by the controller to adjust the amount of intake airflow diverted away from the engine and to atmosphere.

Additionally, a wastegate 127 may be disposed in a bypass passage around the turbine, which may be adjusted, via actuation from the controller, to increase or decrease exhaust gas flow through the turbine. For example, opening the wastegate (or increasing the amount of opening) may decrease exhaust flow through the turbine and correspondingly decrease the rotational speed of the compressor. As a result, less air may enter the engine, thereby decreasing the boost pressure.

The vehicle system may further include a cooling system 150 (e.g., an engine cooling system). The cooling system may circulate coolant through the engine to absorb waste engine heat to distribute to a heat exchanger, such as a radiator 152 (e.g., a radiator heat exchanger). In one example, the coolant may be water, anti-freeze, or a mixture of the two. In another example, the coolant may be oil. A fan 154 may be further coupled to the radiator to maintain an airflow through the radiator when the vehicle is moving slowly or stopped while the engine is running. In some examples, a fan speed may be controlled by the controller. Coolant that is cooled by the radiator may enter a tank (not shown in FIG. 1). The coolant may then be pumped by a pump 156 back to the engine or to another component of the vehicle system.

The vehicle system may include an aftertreatment system 117 coupled in the exhaust passage downstream of the turbocharger. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, a three-way catalyst, a NOx trap, or various other devices or systems. In one example, an aftertreatment temperature sensor 115 is arranged at or upstream of an inlet of the aftertreatment system, which may measure a temperature of exhaust gas prior to entering the aftertreatment system. Additionally, one or more AFR sensors or oxygen ($O_2$) sensors may be arranged on an exhaust conduit upstream and/or downstream of the aftertreatment system. For example, an AFR sensor or $O_2$ sensor 181 may be arranged at the inlet of the aftertreatment system, which may estimate an AFR of the engine from the exhaust gas prior to entering the aftertreatment system, or an AFR sensor or $O_2$ sensor 182 may be arranged downstream of the aftertreatment system (e.g., at an exhaust pipe), which may estimate an AFR of the exhaust gas exiting the aftertreatment system.

Catalysts, such as DOCs, are shown to exhibit increased (e.g., peak) conversion of exhaust gas components at a particular exhaust gas temperature. As such, for reducing vehicle emissions, it may be desirable to maintain the exhaust temperature within a range of temperatures enabling efficient conversion of exhaust gas components by the catalyst used in the exhaust gas aftertreatment system. For example, no oxidation or conversion may occur at low exhaust gas temperatures (e.g., below approximately 120° C.). As a temperature of the catalyst in the aftertreatment system increases, the oxidation or conversion rates may increase. As the catalyst temperature is raised above a threshold temperature (e.g., 150° C.), also referred to herein as a light-off temperature of the catalyst, the conversion rates may increase steeply with increasing temperature until a plateau is reached. As such, it may be desirable to maintain the exhaust gas temperature above the plateau temperature, such as within a range in which typical exhaust gas aftertreatment systems exhibit near maximum conversion efficiency (e.g., 250-350° C.) in order to reduce vehicle emissions. However, very high temperatures (e.g., greater than 750° C.) may cause catalyst degradation. For example, sintering may occur, resulting in a loss of surface area that reduces the ability of the aftertreatment system to convert the exhaust system components. It may be understood by one skilled in the art that the temperatures given above are exemplary and not prescriptive and that each aftertreatment component and catalyst formulation may have different lower and upper temperatures for optimal operation.

Therefore, the temperature of the exhaust gases entering the aftertreatment system may be controlled by the controller to ensure that an efficiency of the aftertreatment is increased while catalyst degradation is decreased. As a further example, NOx reduction may be achieved via control of the air flow to the engine. However, such a change in air flow may increase an amount of boost demanded from the turbocharger, and so operation of the turbocharger may be adjusted to decrease vehicle emissions. In one example, the aftertreatment temperature sensor further comprises composition sensors. Suitable sensors may include hydrocarbon, NOx, or carbon monoxide sensors. Depending on the signals from the aftertreatment temperature sensor, the controller may execute various instructions to raise, lower, or maintain the exhaust gas temperature.

Figure 2:
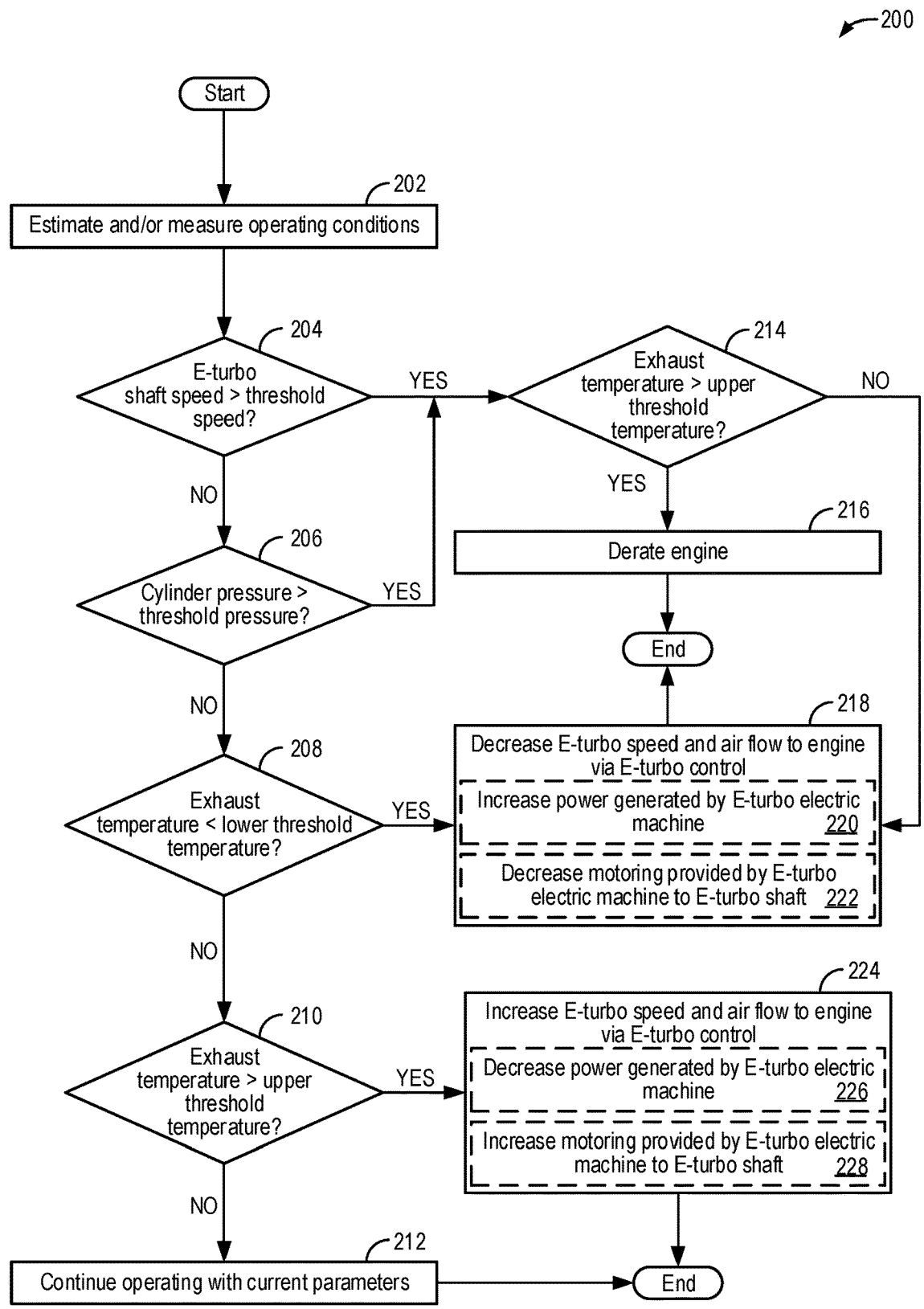
FIG. 2 shows a flowchart illustrating an example method for controlling engine operating parameters, including an exhaust temperature, via E-turbo adjustments.
Figure 3A:
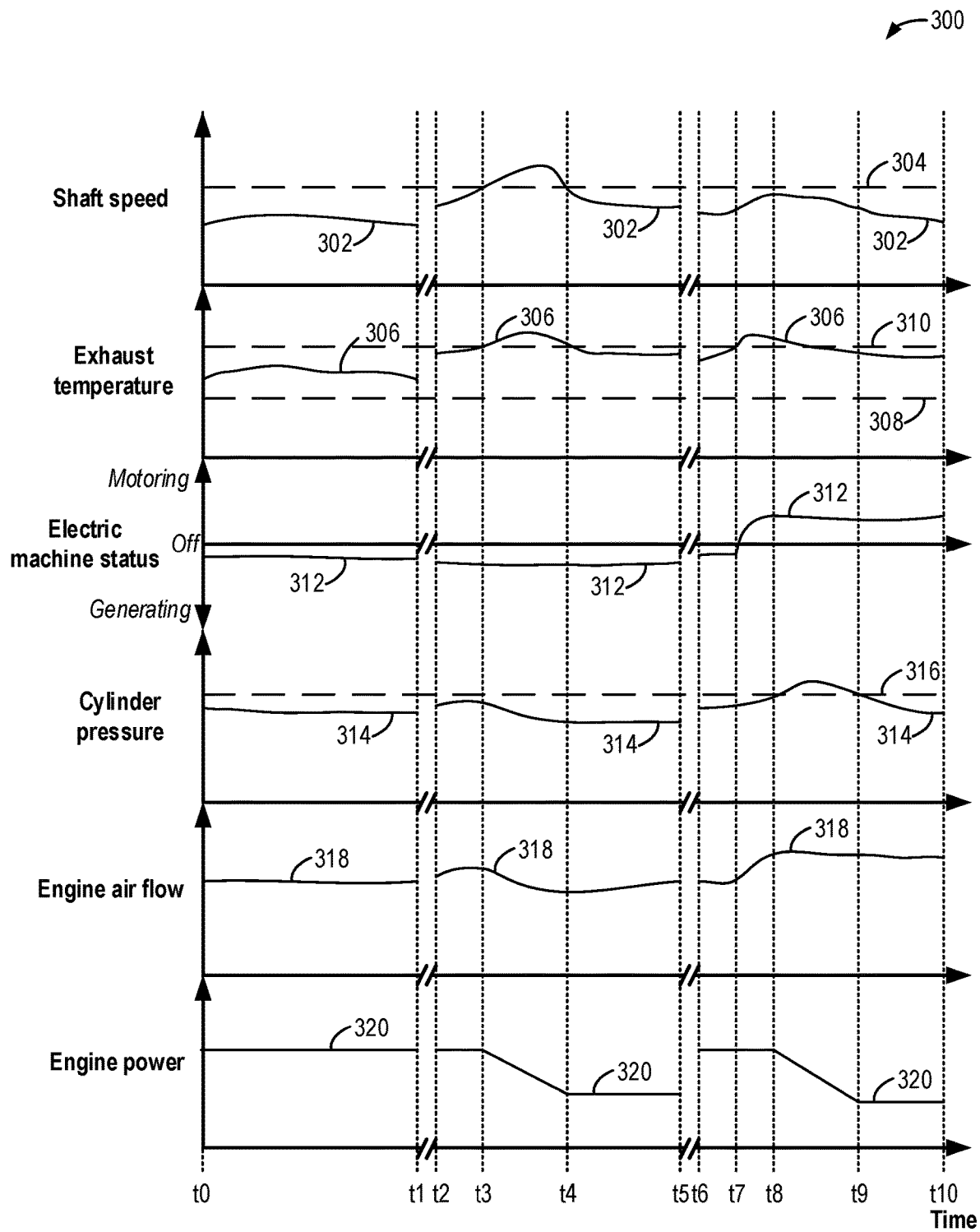
FIGS. 3A and 3B show a prophetic timeline of E-turbo and engine adjustments in response to changing operating conditions.
Figure 3B:
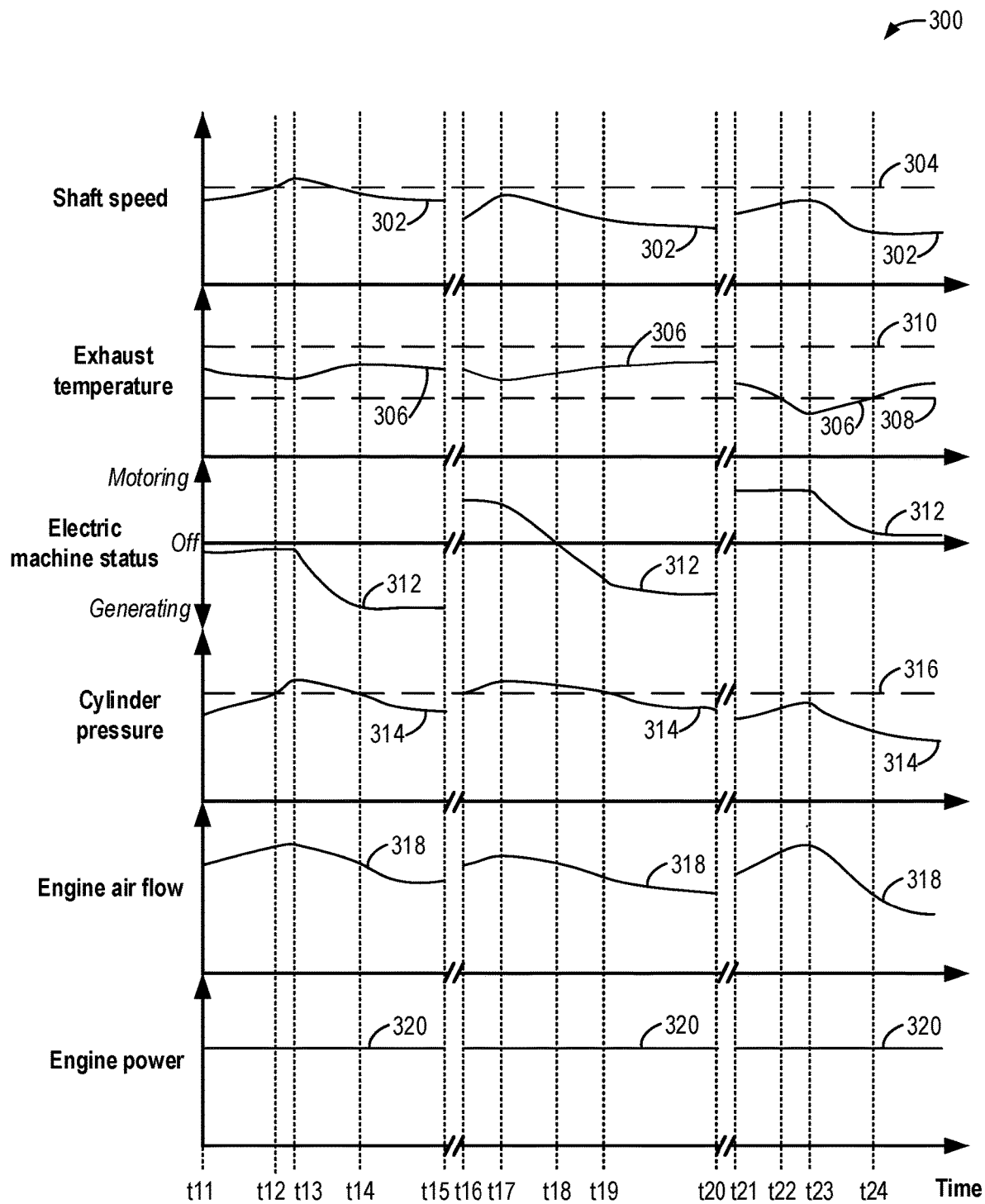

As will be elaborated herein with respect to FIG. 2, the E-turbo may be adjusted to control the temperature of the exhaust gases, a speed of the E-turbo shaft, and a cylinder pressure. For example, in response to operating with one or more of the exhaust gas temperature below a lower threshold temperature, the E-turbo shaft speed above a threshold speed, and the cylinder pressure above a threshold pressure, the controller may increase an amount of energy extracted by the electric machine, which decreases a remaining portion of energy used to mechanically power the compressor of the turbocharger. At least a portion of the extracted energy may be used to power the alternator or to power the wheels via the electric traction motors, for example. As a result of the decreased power supplied to the compressor, the E-turbo shaft speed may decrease and an overall airflow to the engine may decrease, resulting in a decreased cylinder pressure and an increase in the temperature of the exhaust gases flowing through the aftertreatment system. Conversely, in response to operating with the exhaust gas temperature above an upper threshold temperature, the controller may increase an amount of energy supplied by the electric machine in order to increase the speed of the E-turbo shaft, and thus increase the work output of the compressor and the air flow provided to the engine. As a result of the increased air flow to the engine, the exhaust gas temperature may be decreased.

In yet another example, the wastegate may be adjusted to increase or decrease the flow of exhaust gases through the turbine. As the flow of exhaust gases through the turbine is increased, a temperature of the exhaust gases may be reduced and the speed of the E-turbo shaft may be increased. Alternatively, as the flow of exhaust gases through the turbine is decreased, the temperature of the exhaust gases may increase and a speed of the E-turbo shaft may decrease. Thus, by opening or closing the wastegate, thereby decreasing or increasing, respectively, the exhaust flow through the turbine, the temperature of the exhaust gases entering the aftertreatment system may be at least partially controlled to maintain the exhaust gases within the temperature range at which an efficiency of the aftertreatment system is increased. However, using the wastegate to control the exhaust gas temperature may be less efficient than adjusting the E-turbo via the electric machine, as no power is extracted via the wastegate.

The vehicle system may include an exhaust gas recirculation (EGR) system 185 coupled to the engine. The EGR system may route exhaust gas from the exhaust passage of the engine, downstream of the turbine, to the intake passage, upstream of the compressor. In some embodiments, the exhaust gas recirculation system may be coupled exclusively to a group of one or more donor cylinders of the engine (also referred to as a donor cylinder system).

The controller may control various components and operations related to the vehicle. As an example, various components of the vehicle system may be coupled to the controller via a communication channel or data bus. In one example, the controller includes a computer control system. The controller may additionally or alternatively include a memory holding non-transitory (e.g., non-transient) computer readable storage media (not shown) including code for enabling on-board monitoring and control of vehicle operation. In some examples, the controller may include more than one controller that are each in communication with one another, such as a first controller to control the engine and a second controller to control other operating parameters of the vehicle (electric traction motor torque, brake torque, etc.). The first controller may be configured to control various actuators based on output received from the second controller and/or the second controller may be configured to control various actuators based on output received from the first controller.

The controller may receive information from a plurality of sensors and may send control signals to a plurality of actuators. The controller, while overseeing control and management of the vehicle, may receive signals from a variety of engine sensors. The signals may be used to determine operating parameters and operating conditions, and correspondingly adjust various engine actuators to control operation of the vehicle. For example, the engine controller may receive signals from various engine sensors including, but not limited to, engine speed, engine load (derived from fueling quantity commanded by the engine controller, fueling quantity indicated by measured fuel system parameters, averaged mean-torque data, and/or electric power output from the alternator or generator), mass airflow amount/rate (e.g., via a mass airflow meter), intake manifold air pressure, boost pressure, exhaust pressure, ambient pressure, ambient temperature, exhaust temperature (such as the exhaust temperature entering the turbine, as determined from the turbine inlet temperature sensor, or the exhaust temperature entering the aftertreatment system, as determined from the aftertreatment temperature sensor), particulate filter temperature, particulate filter back pressure, engine coolant pressure, exhaust oxides-of-nitrogen quantity (from NOx sensor), exhaust soot quantity (from soot/particulate matter sensor), exhaust gas oxygen level sensor, or the like. Correspondingly, the controller may control the vehicle by sending commands to various components such as the traction motors, the alternator/generator, cylinder valves, fuel injectors, a notch throttle, the compressor bypass valve (or an engine bypass valve in alternate embodiments), the wastegate, or the like. Other actively operating and controlling actuators may be coupled to various locations in the vehicle.

Further, the controller may monitor an engine throttle setting. This may be performed for an engine governor. For example, the engine governor may react to the engine throttle setting in order to adjust engine operation. In one embodiment, the throttle setting may be infinitely adjustable. In one embodiment, an operator of the vehicle may adjust an input device between a plurality of determined engine notch settings. Based on the selected engine notch setting, the controller may adjust engine operation to provide the desired engine performance (e.g., such as a desired vehicle speed). As an example, the plurality of engine notch settings may include a notch 0, a notch 1, a notch 2, a notch 3, a notch 4, a notch 5, a notch 6, a notch 7, and a notch 8. An increase in the numerical value of the notch may correspond (directly or indirectly) with an increase in vehicle speed and/or with engine power output. It may further make adjustments to fuel injection timing and fuel rail pressure. For example, notch 0 may correspond to not moving the locomotive, notch 4 may provide a mid-level of speed, and notch 8 may be the maximum speed setting. For example, the controller may adjust engine revolutions per minute (RPM), gearing, valve timings, and other parameters in order to move the vehicle at a speed corresponding to the selected engine notch. For example, the engine may be adjusted to generate more power in order to increase the vehicle speed, or to accommodate a heavy load (e.g., due to cargo and/or grade) at a lower vehicle speed.

Turning now to FIG. 2, a flowchart is shown for a method 200 for using an E-turbo (e.g., the turbocharger 120 of FIG. 1) of a vehicle to control operating parameters of an engine system (e.g., the vehicle system 100 of FIG. 1). The E-turbo includes an electric machine (e.g., the electric machine 190 shown in FIG. 1) that may be integrated with an E-turbo shaft (e.g., the shaft 132 shown in FIG. 1) that mechanically couples a turbine and a compressor. Because the electric machine enables the E-turbo to be actively controlled, the E-turbo may be used to provide exhaust temperature control while preventing excessive turbine speeds or boost pressures. The method may be executed by a processor of a controller of the vehicle, such as the controller 110 of the vehicle of FIG. 1, based on instructions stored in a memory of the controller.

At step 202, the method includes estimating and/or measuring operating conditions. Vehicle operating conditions may be estimated based on one or more outputs of various sensors of the vehicle (e.g., such as one or more exhaust temperature sensors, an engine, wheel, and/or turbocharger turbine speed sensor, torque sensor, pressure sensor, etc., as described above in reference to the vehicle system of FIG. 1). Vehicle operating conditions may include an engine speed and load, a cylinder pressure, a vehicle speed, a turbine or turbocharger shaft speed, a transmission oil temperature, an exhaust gas flow rate, an exhaust gas temperature, a mass air flow rate, a coolant temperature, a coolant flow rate, engine oil pressures (e.g., oil gallery pressures), operating modes of one or more intake valves and/or exhaust valves, electric traction motor velocity, a state of charge (SOC) of an energy storage device (e.g., the energy storage device 196 of FIG. 1), an engine torque or power output, and a vehicle wheel torque. For example, the turbine speed sensor may be the turbine speed sensor 180 of FIG. 1. In another example, the exhaust gas temperature may be measured downstream of a turbine of the E-turbo and upstream of an aftertreatment system (e.g., via the aftertreatment temperature sensor 115 of FIG. 1). Alternatively, the exhaust gas temperature may be measured upstream of the turbine (e.g., via the turbine inlet temperature sensor 125). As another example, a first exhaust gas temperature may be measured upstream of the turbine, and a second exhaust gas temperature may be measured downstream of the turbine (and upstream of the aftertreatment system). As a further example, the cylinder pressure may be measured by an in-cylinder pressure sensor or inferred based on a compression ratio of the cylinder and other engine operating conditions (e.g., the engine speed and load).

At step 204, the method includes determining if the E-turbo shaft speed is above (e.g., greater than) a threshold speed. For example, the threshold speed may be a non-zero number stored within the memory of the controller and may be an upper bound of a desired shaft speed range. For example, the desired shaft speed range may be a range within which an efficiency of the engine is maximized, a range within which an efficiency of the aftertreatment system is maximized, or a range within which a remaining useful life of the E-turbo is increased. Conversely, the remaining useful life of the E-turbo may be decreased when the E-turbo is operated at E-turbo shaft speeds above the threshold speed, such as due to degradation of E-turbo components. In one example, the threshold speed is 22,000 rpm. As another example, the threshold speed may be between 20,000 rpm and 23,000 rpm or between 35,000 rpm and 40,000 rpm. The E-turbo shaft speed may also be referred to simply as the E-turbo speed. It may be known to one skilled in the art that the threshold turbocharger speeds given above are exemplary and not prescriptive and that each unique turbocharger can have different ideal operating ranges.

In response to operating with the E-turbo shaft speed greater than the threshold speed, the method continues to step 214 and includes determining if the exhaust gas temperature is above (e.g., greater than) an upper threshold temperature. For example, it may be desirable to decrease the E-turbo shaft speed in response to the E-turbo shaft speed exceeding the threshold speed, but decreasing the E-turbo shaft speed also decreases a work output of the compressor and, thus, the air flow through the engine. Decreasing the air flow through the engine may increase the exhaust gas temperature. Therefore, the controller also considers the exhaust gas temperature in deciding whether to slow the E-turbo. The upper threshold temperature may be a non-zero number stored in the memory of the controller above which turbine degradation may occur (e.g., after prolonged exposure to temperatures above the upper threshold temperature).

Additionally or alternatively, the upper threshold temperature may be a temperature at which an aftertreatment system of the vehicle may not operate efficiently and/or degrade (e.g., after prolonged exposure to temperatures above the upper threshold temperature).

In response to operating with the exhaust gas temperature above the upper threshold temperature, the method proceeds to step 216 and includes derating the engine. Due to the conflicting conditions of the E-turbo shaft speed above the threshold speed and the exhaust gas temperature above the exhaust temperature, air flow through the engine may not be adjusted by the electric machine, and instead, the engine is derated. Derating the engine may include decreasing the output (e.g., the power output) of the engine, which allows for the E-turbo shaft speed and the exhaust gas temperature to decrease. The engine system may be re-optimized at the reduced output, which may be less efficient. The method may then end.

Returning to step 214, in response to operating with the exhaust gas temperature below the upper threshold temperature while the E-turbo shaft speed is greater than the threshold speed, the method continues to step 218 and includes decreasing the E-turbo speed and the air flow to the engine via E-turbo control. For example, decreasing the E-turbo speed below the threshold speed increases the remaining useful life of the E-turbo. As mentioned above, decreasing the E-turbo speed decreases the work output of the compressor, which decreases air flow to the engine.

In one example, decreasing the E-turbo speed and the air flow to the engine includes increasing a power generated by the E-turbo electric machine, as indicated at step 220. For example, the electric machine may be switched to operating in a generating mode where power is extracted from the E-turbo as electrical energy, which may be stored in the energy storage device or directly supplied to one or more electrical loads (such as the electric traction motors, accessory devices, vehicle lights, etc.). If the electric machine is already operating in the generating mode, the electric machine may increase the amount of energy extracted from the E-turbo. In some examples, increasing the amount of power generated by the electric machine may decrease a demand on an alternator, and thus, an alternator load may be decreased. By decreasing the speed of the shaft, an amount of energy supplied to a compressor of the E-turbo may decrease, which decreases the air flow to the engine. By decreasing the air flow to the engine, the temperature of the exhaust gases may increase because it is less diluted with (cooler) air.

In some examples, the controller may increase the power generated by the E-turbo electric machine in proportion to a desired speed reduction that will bring the E-turbo speed below the threshold speed. The power extracted (e.g., generated) by the E-turbo electric machine generally may increase as the desired speed reduction increases. For example, the controller may input the current E-turbo speed into a look-up table, function, or map, which may output the amount of power to generate (e.g., extract) with the electric machine to bring the E-turbo shaft speed below the threshold speed. Additional control logic for decreasing the E-turbo speed by increasing the power generated by the electric machine will be described below with respect to reducing the cylinder pressure and increasing the exhaust temperature, which may be used alone or in combination with the logic described above.

In another example, decreasing the E-turbo speed and the air flow to the engine includes decreasing motoring provided by the E-turbo electric machine to the E-turbo shaft, as indicated at step 222. If the electric machine is operating in a motoring mode (e.g., adding mechanical energy to the E-turbo), then the electric machine may decrease the amount of energy added to the E-turbo in order to decrease the E-turbo speed. For example, the controller may decrease the amount of power provided by the electric machine to the E-turbo shaft in proportion to the desired speed reduction. Generally, the power provided by the E-turbo electric machine to the E-turbo shaft may decrease as the desired speed reduction increases. Similar to that described above at step 220, the controller may input the current E-turbo speed into a look-up table, function, or map, which may output a decreased amount of power to provide with the electric machine that is expected to bring the E-turbo shaft speed below the threshold speed.

As may be understood from the above, in some examples, the electric machine may switch from operating in the motoring mode to the generating mode. By changing from adding energy (e.g., motoring) to taking energy (e.g., generating) the E-turbo speed may be decreased. For example, the transition from motoring to generating may include continuously decreasing the amount of energy provided during motoring and smoothly transitioning into increasing the amount of energy provided during generating. In another example, the motoring may be decreased until the electric machine is off and not adding or taking energy from the E-turbo. Thus, decreasing the E-turbo speed and the air flow to the engine may include performing one or both of increasing the power generated by the E-turbo electric machine and decreasing the motoring providing the E-turbo electric machine to the E-turbo shaft.

Further, it may be understood that in some examples, the electric machine may be a motoring-only electric machine that may only be operated in the motoring mode or a generating-only electric machine that may only be operated in the generating mode. For example, the method at step 218 includes step 222, and does not include step 220, to decrease the E-turbo speed and the air flow to the engine when the electric machine is a motoring-only electric machine. As another example, the method at step 218 includes step 220, and does not include step 222, to decrease the E-turbo speed and the air flow to the engine when the electric machine is a generating-only electric machine. It may be further understood that if E-turbo control alone is unable to fully decrease the E-turbo speed and the air flow to the engine as desired, then other controls may be implemented in parallel (e.g., derating the engine). For example, the engine may be derated in response to the electric machine reaching a maximum amount of power generation (e.g., for a generating-only electric machine or a motor/generator) or reaching a minimum amount of motoring (e.g., for a motoring-only electric machine). As an example, the minimum amount of motoring may include supplying no power to the shaft with the electric machine.

In yet another example, a wastegate (e.g., the wastegate 127 shown in FIG. 1) may be adjusted to decrease the flow of exhaust gases through the turbine. As the flow of exhaust gases through the turbine is decreased, the speed of the E-turbo shaft may be reduced. Thus, by opening the wastegate, the exhaust flow through the turbine is reduced, reducing the power provided to the turbine by the exhaust gases and reducing the E-turbo shaft speed. In yet another example where the turbine is a VGT, the VGT vanes may be adjusted to increase a cross-sectional flow area of a turbine nozzle, thus decreasing a speed of the exhaust gas flowing though the turbine to decrease the E-turbo speed. In some examples, wastegate and/or VGT control may be performed in addition to adjusting operation of the electric machine (e.g., decreasing motoring or increasing generating).

The method may then end. For example, the method may be repeated at a pre-determined frequency during engine operation to change the E-turbo speed, and thus air flow through the engine, across a variety of operating conditions. As an example, various instances during engine operation may elicit different E-turbo control strategies. As such, at each instance, the controller may adjust the E-turbo control based on the current operating conditions.

Returning to step 204, if the E-turbo shaft speed is not above the threshold speed, such as when the E-turbo speed is less than or equal to the threshold speed, the method proceeds to step 206 and includes determining if the cylinder pressure is above (e.g., greater than) a threshold pressure. For example, the threshold pressure may be a non-zero number stored in the memory of the controller above which a lifetime of the engine may be reduced. For example, operating with the cylinder pressure exceeding the threshold pressure for prolonged periods may increase engine wear or lead to degradation. Thus, it may be desired to maintain the cylinder pressure below the threshold pressure.

In response to operating with the cylinder pressure above the threshold pressure the method continues to step 214 and includes determining if the exhaust temperature is above the upper threshold temperature, as described above. That is, it may be desired to reduce air flow to the engine in order to reduce the cylinder pressure. However, as noted above, reducing the air flow to the engine also increases the exhaust temperature, as less cooling air will dilute the exhaust gas.

Therefore, in response to operating with the exhaust temperature above the upper threshold temperature, the method proceeds to step 216 and includes derating the engine, which is also described above. Due to the conflicting conditions of the cylinder pressure above the threshold pressure and the exhaust gas temperature above the exhaust temperature, air flow through the engine may not be adjusted by the electric machine, and instead, to decrease the cylinder pressure and exhaust gas temperature below their respective thresholds, the engine is derated.

In response to operating with the exhaust gas temperature below the upper threshold temperature while the cylinder pressure is above the threshold pressure, the method continues to step 218, which includes decreasing the E-turbo speed and the air flow to the engine via the E-turbo control.

Decreasing the air flow through the engine may decrease the pressure within the cylinder and increase a lifetime of the engine. As described above, decreasing the E-turbo speed (and thus the air flow to the engine) may include increasing the power generated by the E-turbo electric machine, as indicated at step 220, and/or decreasing the motoring provided by the E-turbo electric machine to the E-turbo shaft, as shown at step 222.

As one example, the controller may increase the power generated by the E-turbo electric machine in proportion to a desired air flow reduction that will bring the cylinder pressure below the threshold pressure. For example, the controller may input the current cylinder pressure into a look-up table, function, or map, which may output the amount of power to generate (e.g., extract) with the electric machine to bring the cylinder pressure below the threshold pressure. As another example, the controller may decrease the amount of power provided by the electric machine to the E-turbo shaft in proportion to the desired air flow reduction. For example, the controller may input the current cylinder pressure into a look-up table, function, or map, which may output a decreased amount of power to provide with the electric machine that is expected to bring the cylinder pressure below the threshold pressure. The method may then end.

Returning to step 206, if the cylinder pressure is below the threshold pressure, the method continues to step 208 and includes determining if the exhaust temperature is below a lower threshold temperature. As an example, the lower threshold temperature may be a non-zero number stored in the memory of the controller below which the aftertreatment device(s) may not efficiently treat emissions from the engine. For example, the lower threshold temperature may be a lower limit of a desired temperature range of the one or more aftertreatment devices, where the desired temperature range is a range of temperatures at which an efficiency of the one or more aftertreatment devices is maximized. As a result of the temperature of the exhaust gas decreasing below the lower threshold temperature, a level of emissions released into the atmosphere via the exhaust gas may increase. Further, it may be understood that the lower threshold temperature is less than the upper threshold temperature introduced at step 214.

In response to operating with the exhaust temperature below (e.g., less than) the lower temperature threshold, the method continues to step 218 and includes decreasing the E-turbo speed and the air flow to the engine via the E-turbo control. By decreasing the air flow through the engine, the temperature of exhaust gases may increase, as a smaller amount of cooling air is provided in the exhaust flow. As described above, decreasing the E-turbo speed (and thus the air flow to the engine) may include increasing the power generated by the E-turbo electric machine, as indicated at step 220, and/or decreasing the motoring provided by the E-turbo electric machine to the E-turbo shaft, as shown at step 222.

As one example, the controller may increase the power generated by the E-turbo electric machine in proportion to a desired air flow reduction that will bring the exhaust temperature above the lower threshold temperature. For example, the controller may input the current exhaust temperature into a look-up table, function, or map, which may output the amount of power to generate (e.g., extract) with the electric machine to bring the exhaust temperature above the lower threshold temperature. As another example, the controller may decrease the amount of power provided by the electric machine to the E-turbo shaft in proportion to the desired air flow reduction. For example, the controller may input the current exhaust temperature into a look-up table, function, or map, which may output a decreased amount of power to provide with the electric machine that is expected to bring the exhaust temperature above the lower threshold temperature. In general, the power extracted (e.g., generated) by the E-turbo electric machine may increase as the desired air flow reduction increases, and the power provided by the E-turbo electric machine to the E-turbo shaft may decrease as the desired air flow reduction increases. The method may then end.

If instead the exhaust temperature is above (e.g., greater than) the lower temperature threshold, the method continues to step 210 and includes determining if the exhaust temperature is above the upper threshold temperature. Determining if the exhausts temperature is above the upper threshold temperature may be performed as described above at step 214. For example, additional cooling air flow may be desired when the exhaust temperature is greater than the upper threshold temperature.

In response to operating with the exhaust gas temperature above the upper threshold temperature while the E-turbo speed is not greater than the threshold speed and the cylinder pressure is not greater than the threshold pressure, the method continues to step 224 and includes increasing the E-turbo speed and the air flow to the engine via the E-turbo control. Increasing the E-turbo shaft speed increases the work output of the compressor, which increases the air flow to the engine (and thus the cylinder pressure) and dilutes the exhaust flow with cooler air, thus decreasing the exhaust gas temperature.

In some examples, increasing the E-turbo speed and the air flow to the engine via the E-turbo control includes decreasing the power generated by the E-turbo electric machine, as indicated at step 226 of the method. Decreasing the power generated by the electric machine reduces the power extracted from the E-turbo shaft, thus increasing the E-turbo speed and the air flow through the engine. In one example, decreasing the power generated by the electric machine may increase the demand on the alternator to supply electrical power to various electrical loads of the vehicle (such as the electric traction motors, vehicle lights, etc.)

For example, the controller may decrease the power generated by the E-turbo electric machine in proportion to a desired air flow increase that will bring the exhaust temperature below the upper threshold temperature. For example, the controller may input the current exhaust temperature into a look-up table, function, or map, which may output the decreased amount of power to generate (e.g., extract) with the electric machine to bring the exhaust temperature below the upper threshold temperature. Generally, the power extracted by the E-turbo electric machine from the E-turbo shaft may decrease as the desired air flow further increases.

In some examples, increasing the E-turbo speed and the air flow to the engine via the E-turbo control includes increasing the motoring provided by the E-turbo electric machine to the E-turbo shaft, as indicated at step 228 of the method. For example, the controller may increase an amount of electric power used by the electric machine, which is converted to mechanical energy used to rotate the electric machine and thus, the E-turbo shaft. As one example, the controller may increase the motoring provided by the E-turbo electric machine in proportion to the desired air flow increase that is expected to bring the exhaust temperature below the upper threshold temperature. For example, the controller may input the current exhaust temperature into a look-up table, function, or map, which may output the increased amount of power to consume with the electric machine to bring the exhaust temperature below the upper threshold temperature.

Further, it may be understood that the method at step 224 includes step 228, and does not include step 226, when the electric machine is a motoring-only electric machine. As another example, the method at step 224 includes step 226, and does not include step 228, when the electric machine is a generating-only electric machine. It may be further understood that if E-turbo control alone at step 224 is unable to fully increase the E-turbo speed and the air flow to the engine as desired, then other controls may be implemented in parallel (e.g., adjusting engine power). For example, the engine may be derated in response to the electric machine reaching a minimum amount of power generation (e.g., for a generating-only electric machine) or reaching a maximum amount of motoring (e.g., for a motoring-only electric machine or a motor/generator). As an example, the minimum amount of power generation may include extracting no power from the shaft with the electric machine.

In yet another example, the wastegate may be adjusted to increase the flow of exhaust gases through the turbine. As the flow of exhaust gases through the turbine is increased, the speed of the E-turbo shaft may be increased. Thus, by further closing the wastegate, the exhaust flow through the turbine is increased, increasing the power provided to the turbine by the exhaust gases and increasing the E-turbo shaft speed. In yet another example where the turbine is a VGT, the VGT vanes may be adjusted to decrease a cross-sectional flow area of a turbine nozzle, thus increasing the speed of the exhaust gas flowing though the turbine to increase the E-turbo speed. In some examples, the wastegate and/or VGT control may be performed in addition to adjusting operation of the electric machine (e.g., increasing motoring or decreasing generating) to increase the E-turbo speed and the air flow to the engine. The method may then end.

Returning to step 210, if it is determined that the exhaust temperature is below the upper temperature threshold, the method proceeds to step 212. At step 212, the method includes continuing to operate with the current parameters. For example, the engine system may be operating with increased efficiency and a reduced likelihood of degradation while operating with the E-turbo speed below the threshold speed, the cylinder pressure below the threshold pressure, and the exhaust temperature between the lower threshold temperature and the upper threshold temperature. As such, the current operating parameters may be substantially maintained until the operating conditions change. The method may then end.

In this way, the E-turbo may be used to maintain the exhaust temperature within a desired operating range (e.g., between the lower threshold temperature and the upper threshold temperature) while reducing or preventing overboost (e.g., operating with the cylinder pressure above the threshold pressure) and excessive E-turbo speeds (e.g., operating with the E-turbo shaft speed above the threshold speed). As a result, the efficiency of the aftertreatment system may be increased while also increasing the useful lifetime of the E-turbo and the engine.

Further, the method 200 may also be used to transiently adjust the exhaust gas temperature or the air flow to the engine. For example, the exhaust temperature may be temporarily raised by decreasing the E-turbo speed and the air flow to the engine via the E-turbo control (e.g., via step 218 of the method) to regenerate a particulate filter. As another example, the air flow may be transiently increased (e.g., via step 224 of the method) or decreased (e.g., via step 218 of the method) via the E-turbo control as part of a proactive transient operation. In this way, adjusting the E-turbo control provides flexible exhaust temperature and engine air flow control for a wide variety of operating conditions.

Referring now to FIGS. 3A and 3B, a prophetic timeline 300 is shown for operating an engine and an electric machine of an E-turbo to control air flow through a vehicle. For example, the vehicle may be the vehicle 106 shown in FIG. 1. The electric machine may be the electric machine 190 coupled to the shaft 132 of the turbocharger 120, as shown in FIG. 1. A shaft speed is shown in a plot 302, a threshold speed is shown by a dashed line 304, an exhaust temperature is shown in a plot 306, a lower threshold temperature is shown by dashed line 308, an upper threshold temperature is shown by a dashed line 310, an operating status of the electric machine is shown in a plot 312, a cylinder pressure is shown in a plot 314, a threshold pressure is shown by a dashed line 316, an engine air flow is shown in a plot 318, and an engine power is shown in a plot 320.

For all of the above, the horizontal axis represents time, with time increasing along the horizontal axis from left to right. The vertical axis represents each labeled parameter. Vertical lines at times t0-t24 represent time points of interest. The plots in FIGS. 3A and 3B are time aligned and occur at the same time. For plots 302, 306, 314, 318, and 320 the labeled parameter increases up the vertical axis from bottom to top. For example, in plot 306 increasing along the vertical axis indicates the temperature of exhaust gases is increasing. For plot 312, the vertical axis indicates the electric machine status as off, motoring, or generating, as labeled. For example, increasing in the "generating" direction (e.g., decreasing further below the "off" status) represents increasing an amount of energy extracted from the E-turbo shaft by the electric machine, whereas increasing in the "motoring" direction (e.g., increasing further above the "off" status) represents increasing an amount of energy provided to the E-turbo shaft by the electric machine.

Additionally, the threshold speed (dashed line 304), the upper threshold temperature (dashed line 310), the lower threshold temperature (dashed line 308), and the threshold pressure (dashed line 316) are non-zero values stored in a memory of a controller, as defined above with respect to FIG. 2. The threshold speed may indicate a shaft speed above which increased E-turbo degradation may occur, which may reduce a remaining useful life of the E-turbo. The range of temperatures between the lower threshold temperature and the upper threshold temperature may represent an efficient temperature range for operating an aftertreatment system. Further, E-turbo (e.g., turbine) degradation and/or aftertreatment system degradation may be increased while operating at temperatures above the upper threshold temperature. Furthermore, the threshold pressure may be a cylinder pressure above which increased engine degradation may occur, thus decreasing a remaining useful life of the engine.

From time t0 to time t1, the shaft speed (plot 302) is maintained below the threshold speed (dashed line 304), the exhaust temperature (plot 306) is below the upper threshold temperature (dashed line 310) and above the lower threshold temperature (dashed line 308) (e.g., within the efficient temperature range for the aftertreatment device), and the cylinder pressure (plot 314) is below the threshold pressure (dashed line 316). Thus, the shaft speed, exhaust temperature, and cylinder pressure are maintained from time t0 to t1, as the engine is operating efficiently and with a decreased likelihood of degradation. For example, the electric machine status from time t0 to t1 may be maintained at a substantially constant level of generating, and the engine power is not decreased to decrease air flow. Further, due to maintaining engine conditions, the engine air flow (plot 318) remains relatively constant.

An elapse in time occurs between time t1 to time t2, as indicated by the breaks in the horizontal (e.g., time) axes. The elapse may be seconds, minutes, hours, days, weeks, etc. For example, time t1 may occur during a same or different vehicle trip than time t2. Thus, in some examples, the vehicle may be continuously operated between time t1 and time t2, while in other examples, one or a plurality of vehicle trips may occur between time t1 and time t2.

Between time t2 and time t3, both the shaft speed (plot 302) and the exhaust temperature (plot 306) increase. Further, because the shaft speed increases, the engine air flow (plot 318) and the cylinder pressure (plot 314) also increase. At time t3, the exhaust temperature (plot 306) increases above the upper threshold temperature (dashed line 310) and the shaft speed (plot 302) increases above the threshold speed (dashed line 304). In response to the exhaust temperature increasing above the threshold temperature, it is desired to increase the engine air flow to dilute the exhaust gas with additional cooling air. However, it is desired to decrease the E-turbo shaft speed, which decreases the engine air flow, due to the E-turbo shaft speed being greater than the threshold speed. Due to these conflicting desires, the engine power is decreased (e.g., the engine is derated) at time t3 instead of adjusting the electric machine. As a result of derating the engine, both the exhaust temperature and the shaft speed decrease below their respective thresholds (e.g., the upper threshold temperature and the threshold speed, respectively) at time t4. From time t3 to time t4, the engine air flow and cylinder pressure also decrease due to derating the engine during this time period. In this way, decreasing the engine power enables the system to be re-optimized so that the exhaust temperature is maintained within a desired range and prolonged operation at excessive shaft speeds is avoided.

A second elapse in time occurs between time t5 and time t6, as indicated by the break in the horizontal axis of each plot. The second elapse in time may be a similar or different length than the elapse in time that occurred between time t1 and time t2.

The exhaust temperature (plot 306) increases between time t6 and time t7 and increases above the upper threshold temperature (dashed line 310) at time t7. Further, the shaft speed (plot 302) and the cylinder pressure (plot 314) are both below their respective thresholds at time t7. In response to the exhaust temperature increasing above the upper threshold temperature while the shaft speed is below the threshold speed and the cylinder pressure it below the threshold pressure (dashed line 316), operation of the electric machine status is adjusted to increase the air flow through the engine, thus decreasing the exhaust temperature. Therefore, at time t7, the electric machine status (plot 312) changes from the generating mode to the motoring mode.

The increase in motoring causes an increase in engine air flow, shaft speed, and cylinder pressure. At time t8, due to the increase in air flow, the cylinder pressure surpasses the threshold pressure. Additionally, at time t8, the exhaust temperature is not yet below the upper threshold temperature, and as such, decreasing motoring to decrease the cylinder pressure would result in the exhaust temperature remaining above the upper temperature threshold. Therefore, instead of decreasing motoring, the motoring plateaus at time t8 and the engine power (plot 320) is decreased as the engine is derated. The engine power continues to decrease until time t9, at which time the cylinder pressure is below the threshold pressure and the exhaust temperature is below the upper threshold temperature. From time t9 to time t10, the cylinder pressure remains below the threshold pressure, the shaft speed remains below the threshold speed, and the exhaust temperature remains below the upper threshold temperature and above the lower threshold temperature. As such, the electric machine status and engine power are not further adjusted.

Between time t10 (FIG. 3A) and time t11 (FIG. 3B), a third time elapse occurs, which may be seconds, minutes, hours, days, etc. in duration. From time t11 to time t12, the shaft speed (plot 302) and the cylinder pressure (plot 314) increase while the exhaust temperature remains relatively stable. Additionally, the electric machine (plot 312) is operating in the generating mode and extracting a relatively small amount of energy from the E-turbo shaft, the engine air flow (plot 318) increases, and the engine power (plot 320) does not change. At time t12, the shaft speed increases above the threshold speed (dashed line 304), and the cylinder pressure also increases above the threshold pressure (dashed line 316). As such, decreasing the air flow to decrease E-turbo and engine degradation is desired. In response to the shaft speed exceeding the threshold speed and the cylinder pressure exceeding the threshold pressure, at time t13, the amount of generating performed by the electric machine is increased. By increasing the generating, more mechanical energy is removed from the shaft and converted into electric energy within the electric machine. As a result, the shaft speed decreases, causing the engine air flow to decrease, which decreases the cylinder pressure. Further, the exhaust temperature increases due to there being less cooling air diluting the exhaust, but the exhaust temperature remains below the upper threshold temperature.

Shortly before time t14, the shaft speed decreases below the threshold speed. However, the cylinder pressure remains above the threshold pressure, and so the amount of generating performed by the electric machine continues to increase. At time t14, the cylinder pressure decreases below the threshold pressure. In response, the amount of generating performed by the electric machine plateaus. Because of the air flow adjustment is provided through E-turbo control, the engine power (plot 320) is not adjusted.

Between time t15 and t16, a fourth time elapse occurs, which may be seconds, minutes, hours, days, etc. in duration. At t16, the electric machine is operated in the motoring mode (plot 312), which increases the shaft speed (plot 302). As a result of the increased shaft speed, the engine air flow (plot 318) increases, which also increases the cylinder pressure (plot 314). The cylinder pressure surpasses the threshold pressure (dashed line 316) at time t16. Therefore, in response to the cylinder pressure surpassing the threshold pressure while the exhaust temperature (plot 306) remains below the upper threshold temperature (dashed line 304), the electric machine (plot 312) decreases in motoring to decrease the air flow through the engine at time t17. As a result, less energy is supplied to the E-turbo shaft, causing the shaft speed, and thus the engine air flow and the cylinder pressure, to decrease while the exhaust temperature increases due to the decreased air flow. The amount of motoring supplied by the electric machine decreases until it transitions to operating in the generating mode at time 18, thus extracting energy from the E-turbo shaft to further decrease the shaft speed and the air flow through the engine. The electric machine increases generating until the cylinder pressure decreases below the threshold pressure at time t19.

Because the cylinder pressure decreases below the threshold pressure at time t19, the generating performed by the electric machine substantially plateaus.

Furthermore, from time t19 to time t20, the cylinder pressure remains below the threshold pressure, the shaft speed remains below the threshold speed, and the exhaust temperature remains below the upper threshold temperature and above the lower threshold temperature. As such, the electric machine status is not further adjusted nor is the engine power (plot 320) adjusted.

From time t20 to t21, a fifth time elapse occurs, as indicated by the breaks in the horizontal axes of each plot. The fifth time elapse may be seconds, minutes, hours, days, weeks, etc. in duration. From time t21 to time t22, the shaft speed (plot 302), the cylinder pressure (plot 314), and the engine air flow (plot 318) increase, and as a result, the exhaust temperature (plot 306) decreases. Additionally, the electric machine (plot 312) is operating in the motoring mode, and thus adding mechanical energy to the E-turbo shaft. At time t22, the increased air flow through the engine causes the exhaust temperature to decrease below the lower threshold temperature (dashed line 308). By decreasing below the lower threshold temperature, the aftertreatment system may not efficiently treat exhaust gas emissions. As such, it is desired to increase the exhaust temperature above the lower threshold temperature by decreasing the air flow through the engine. In response to the exhaust temperature decreasing below the lower temperature threshold, the electric machine decreases in motoring beginning at time t23. As a result, the shaft speed decreases, thus decreasing the cylinder pressure and the air flow through the engine. As the air flow through the engine decreases, the exhaust temperature increases, as there is less cooling air diluting the exhaust gas. The electric machine continues to decrease in motoring until time t24, at which time motoring of the electric machine plateaus because the exhaust temperature increases above the lower threshold temperature. Additionally, because of the air flow adjustment provided through the E-turbo control, the engine power (plot 320) is not adjusted to increase the exhaust temperature.

The examples shown herein are illustrative and not prescriptive. Other scenarios may occur where the parameters shown vary in other, different ways in relation to each other, ambient conditions, other engine or vehicle systems and the demand of the operator and controllers.

In this way, E-turbo control may enable an exhaust temperature to be maintained within a range of temperatures for effective operation of aftertreatment device(s) while further ensuring that a turbine of an E-turbo is not subjected to excessively high temperatures with fewer adjustments to engine operation (e.g., derating) than when an E-turbo is not included. Further, the E-turbo control enables an E-turbo shaft speed to be reduced (e.g., in response to the E-turbo shaft speed exceeding a threshold speed) and a cylinder pressure to be reduced (e.g., in response to the cylinder pressure exceeding a threshold pressure). As such, an electric machine of the E-turbo may be operated as an actuator to adjust an amount of power added to or extracted from the E-turbo in order to adjust the E-turbo speed and the air flow to the engine and, thus, the exhaust temperature and the cylinder pressure. As a result, the efficiency of both the engine and the aftertreatment system may be increased while also increasing the useful lifetime of the aftertreatment system, the E-turbo, and the engine.

The technical effect of controlling air flow through an engine via an electric machine of a turbocharger is that a remaining useful life of engine and exhaust system components is increased while engine efficiency is also increased.

The disclosure also provides support for a system for a vehicle, comprising: an electric turbocharger comprising a compressor, an exhaust turbine coupled to the compressor via a shaft, and an electric machine mechanically coupled to the shaft; and a controller including a processor and instructions stored on a non-transient memory of the controller that, when executed, cause the controller to: adjust an amount of power provided to or extracted from the shaft by the electric machine based on at least one of a speed of the electric turbocharger, a cylinder pressure, and an exhaust gas temperature. In a first example of the system, to adjust the amount of power provided to or extracted from the shaft by the electric machine based on at least one of the speed of the electric turbocharger and the exhaust gas temperature, the controller includes further instructions that, when executed, cause the controller to: while operating the electric machine in a generating mode: increase the amount of power extracted from the shaft by the electric machine in response to at least one of the exhaust gas temperature decreasing below a lower threshold temperature, the cylinder pressure increasing above a threshold pressure while the exhaust gas temperature is less than an upper threshold temperature, and the speed of the electric turbocharger increasing above a threshold speed while the exhaust gas temperature exhaust is less than the upper threshold temperature, and decrease the amount of power extracted from the shaft by the electric machine in response to the exhaust gas temperature increasing above an upper threshold temperature while the speed of the electric turbocharger is less than the threshold speed and the cylinder pressure is less than the threshold pressure. In a second example of the system, optionally including the first example, to adjust the amount of power provided to or extracted from the shaft by the electric machine based on at least one of the speed of the electric turbocharger and the exhaust gas temperature, the controller includes further instructions that, when executed, cause the controller to: while operating the electric machine in a motoring mode: increase the amount of power provided to the shaft by the electric machine in response to the exhaust gas temperature increasing above the upper threshold temperature while the speed of the electric turbocharger is less than the threshold speed and the cylinder pressure is less than the threshold pressure, and decrease the amount of power provided to the shaft by the electric machine in response to at least one of the exhaust gas temperature decreasing below the lower threshold temperature, the speed of the electric turbocharger increasing above the threshold speed while the exhaust gas temperature is less than the upper threshold temperature, and the cylinder pressure increasing above the threshold pressure while the exhaust gas temperature is less than the upper threshold temperature. In a third example of the system, optionally including one or both of the first and second examples, the controller includes further instructions that, when executed, cause the controller to: derate an engine fluidically coupled to the electric turbocharger in response to the exhaust gas temperature increasing above the upper threshold temperature while the speed of the electric turbocharger is greater than the threshold speed or while the cylinder pressure is greater than the threshold pressure. In a fourth example of the system, optionally including one or more or each of the first through third examples, to adjust the amount of power provided to or extracted from the shaft by the electric machine based on at least one of the speed of the electric turbocharger and the exhaust gas temperature, the controller includes further instructions that, when executed, cause the controller to: transition the electric machine from operating in a generating mode to operating in a motoring mode in response to the exhaust gas temperature increasing above an upper threshold temperature while the speed of the electric turbocharger is less than a threshold speed and the cylinder pressure is less than a threshold pressure, transition the electric machine from operating in the motoring mode to operating in the generating mode in response to the speed of the electric turbocharger increasing above the threshold speed while the exhaust gas temperature is less than the upper threshold temperature, and transition the electric machine from operating in the motoring mode to operating in the generating mode in response to the cylinder pressure increasing above the threshold pressure while the exhaust gas temperature is less than the upper threshold temperature.

The disclosure also provides support for a method, comprising: increasing an air flow to an engine by adjusting operation of an electric machine mechanically coupled with a shaft of a turbocharger responsive to an exhaust gas temperature exceeding an upper threshold temperature, and decreasing the air flow to the engine by adjusting the operation of the electric machine responsive to at least one of the exhaust gas temperature decreasing below a lower threshold temperature, a pressure within a cylinder of the engine exceeding a threshold pressure, and a speed of the turbocharger exceeding a threshold speed. In a first example of the method, increasing the air flow to the engine by adjusting the operation of the electric machine comprises increasing the speed of the turbocharger via the electric machine. In a second example of the method, optionally including the first example, increasing the speed of the turbocharger via the electric machine comprises reducing an amount of power generated by the electric machine. In a third example of the method, optionally including one or both of the first and second examples, increasing the speed of the turbocharger via the electric machine comprises increasing an amount of power provided to the shaft by the electric machine. In a fourth example of the method, optionally including one or more or each of the first through third examples, decreasing the air flow to the engine by adjusting the operation of the electric machine comprises decreasing the speed of the turbocharger via the electric machine. In a fifth example of the method, optionally including one or more or each of the first through fourth examples, decreasing the speed of the turbocharger via the electric machine comprises increasing an amount of power generated by the electric machine. In a sixth example of the method, optionally including one or more or each of the first through fifth examples, decreasing the speed of the turbocharger via the electric machine comprises decreasing an amount of power provided to the shaft by the electric machine. In a seventh example of the method, optionally including one or more or each of the first through sixth examples, decreasing the air flow to the engine by adjusting the operation of the electric machine responsive to at least one of the exhaust gas temperature decreasing below the lower threshold temperature, the pressure within the cylinder of the engine exceeding the threshold pressure, and the speed of the turbocharger exceeding the threshold speed is further responsive to the exhaust gas temperature being less than the upper threshold temperature. In an eighth example of the method, optionally including one or more or each of the first through seventh examples, the method further comprises: reducing an engine power in response to at least one of the pressure within the cylinder of the engine exceeding the threshold pressure and the speed of the turbocharger exceeding the threshold speed while the exhaust gas temperature is greater than the upper threshold temperature. In a ninth example of the method, optionally including one or more or each of the first through eighth examples, the exhaust gas temperature is determined based on an output of one or both of a first temperature sensor positioned at a turbine inlet of a turbine of the turbocharger and a second temperature sensor arranged at an inlet of an aftertreatment system positioned downstream of the turbine.

The disclosure also provides support for a method, comprising: at a first instance, operating an engine system with a speed of an electric turbocharger above a threshold speed and an exhaust gas temperature less than an upper threshold temperature, in response to the speed of the electric turbocharger being greater than the threshold speed while the exhaust gas temperature is less than the upper threshold temperature, reducing the speed of the electric turbocharger via an electric machine, at a second instance, operating the engine system with the exhaust gas temperature above the upper threshold temperature while the speed of the electric turbocharger is less than the threshold speed, and in response to the exhaust gas temperature being greater than the upper threshold temperature while the speed of the electric turbocharger is less than the threshold speed, increasing the speed of the electric turbocharger via the electric machine. In a first example of the method, reducing the speed of the electric turbocharger via the electric machine comprises at least one of increasing a first amount of energy extracted by the electric machine from a shaft of the electric turbocharger and decreasing a second amount of energy provided by the electric machine to the shaft of the electric turbocharger. In a second example of the method, optionally including the first example, increasing the speed of the electric turbocharger via the electric machine comprises at least one of decreasing a first amount of energy extracted by the electric machine from a shaft of the electric turbocharger and increasing a second amount of energy provided by the electric machine to the shaft of the electric turbocharger. In a third example of the method, optionally including one or both of the first and second examples, the method further comprises: at a third instance, operating the engine system with the exhaust gas temperature above the upper threshold temperature while the speed of the electric turbocharger is greater than the threshold speed, and in response to the exhaust gas temperature being greater than the upper threshold temperature while the speed of the electric turbocharger is greater than the threshold speed, decreasing the exhaust gas temperature and the speed of the electric turbocharger by derating an engine of the engine system. In a fourth example of the method, optionally including one or more or each of the first through third examples, the method further comprises: at a third instance, operating the engine system with the exhaust gas temperature below a lower threshold temperature, and in response to the exhaust gas temperature being less than the lower threshold temperature, reducing the speed of the electric turbocharger by at least one of increasing a first amount of energy extracted by the electric machine from a shaft of the electric turbocharger and decreasing a second amount of energy provided by the electric machine to the shaft of the electric turbocharger.

As explained above, the terms "high pressure" and "low pressure" are relative, meaning that "high" pressure is a pressure higher than a "low" pressure. Conversely, a "low" pressure is a pressure lower than a "high" pressure.

As used herein, an element or step recited in the singular and preceded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "that includes," "including," or "having" an element or a plurality of elements having a particular property may include additional such elements not having that property. The terms "including" and "in which" are used as the plain-language equivalents of the respective terms "that includes" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for a vehicle, comprising:
   an electric turbocharger comprising a compressor, an exhaust turbine coupled to the compressor via a shaft, and an electric machine mechanically coupled to the shaft; and
   a controller including a processor and instructions stored on a non-transient memory of the controller that, when executed, cause the controller to:
      adjust an amount of power provided to or extracted from the shaft by the electric machine based on at least one of a speed of the electric turbocharger, a cylinder pressure, and an exhaust gas temperature; and
      derate an engine fluidically coupled to the electric turbocharger in response to the exhaust gas temperature increasing above an upper threshold temperature while the speed of the electric turbocharger is greater than a threshold speed or while the cylinder pressure is greater than a threshold pressure.

2. The system of claim 1, wherein to adjust the amount of power provided to or extracted from the shaft by the electric machine based on at least one of the speed of the electric turbocharger and the exhaust gas temperature, the controller includes further instructions that, when executed, cause the controller to:
   while operating the electric machine in a generating mode:
      increase the amount of power extracted from the shaft by the electric machine in response to at least one of the exhaust gas temperature decreasing below a lower threshold temperature, the cylinder pressure increasing above the threshold pressure while the exhaust gas temperature is less than the upper threshold temperature, and the speed of the electric turbocharger increasing above the threshold speed while the exhaust gas temperature exhaust is less than the upper threshold temperature; and
      decrease the amount of power extracted from the shaft by the electric machine in response to the exhaust gas temperature increasing above the upper threshold temperature while the speed of the electric turbocharger is less than the threshold speed and the cylinder pressure is less than the threshold pressure.

3. The system of claim 2, wherein to adjust the amount of power provided to or extracted from the shaft by the electric machine based on at least one of the speed of the electric turbocharger and the exhaust gas temperature, the controller includes further instructions that, when executed, cause the controller to:
   while operating the electric machine in a motoring mode:
      increase the amount of power provided to the shaft by the electric machine in response to the exhaust gas temperature increasing above the upper threshold temperature while the speed of the electric turbocharger is less than the threshold speed and the cylinder pressure is less than the threshold pressure; and
      decrease the amount of power provided to the shaft by the electric machine in response to at least one of the exhaust gas temperature decreasing below the lower threshold temperature, the speed of the electric turbocharger increasing above the threshold speed while the exhaust gas temperature is less than the upper threshold temperature, and the cylinder pressure increasing above the threshold pressure while the exhaust gas temperature is less than the upper threshold temperature.

4. The system of claim 1, wherein to adjust the amount of power provided to or extracted from the shaft by the electric machine based on at least one of the speed of the electric turbocharger and the exhaust gas temperature, the controller includes further instructions that, when executed, cause the controller to:
   transition the electric machine from operating in a generating mode to operating in a motoring mode in response to the exhaust gas temperature increasing above the upper threshold temperature while the speed of the electric turbocharger is less than the threshold speed and the cylinder pressure is less than the threshold pressure;
   transition the electric machine from operating in the motoring mode to operating in the generating mode in response to the speed of the electric turbocharger increasing above the threshold speed while the exhaust gas temperature is less than the upper threshold temperature; and
   transition the electric machine from operating in the motoring mode to operating in the generating mode in response to the cylinder pressure increasing above the threshold pressure while the exhaust gas temperature is less than the upper threshold temperature.

5. A method, comprising:
   increasing an air flow to an engine by adjusting operation of an electric machine mechanically coupled with a shaft of a turbocharger responsive to an exhaust gas temperature exceeding an upper threshold temperature;
   decreasing the air flow to the engine by adjusting the operation of the electric machine responsive to at least one of the exhaust gas temperature decreasing below a lower threshold temperature, a pressure within a cylinder of the engine exceeding a threshold pressure, and a speed of the turbocharger exceeding a threshold speed; and
   reducing an engine power in response to at least one of the pressure within the cylinder of the engine exceeding the threshold pressure and the speed of the turbocharger exceeding the threshold speed while the exhaust gas temperature is greater than the upper threshold temperature.

6. The method of claim 5, wherein increasing the air flow to the engine by adjusting the operation of the electric machine comprises increasing the speed of the turbocharger via the electric machine.

7. The method of claim 6, wherein increasing the speed of the turbocharger via the electric machine comprises reducing an amount of power generated by the electric machine.

8. The method of claim 6, wherein increasing the speed of the turbocharger via the electric machine comprises increasing an amount of power provided to the shaft by the electric machine.

9. The method of claim 5, wherein decreasing the air flow to the engine by adjusting the operation of the electric machine comprises decreasing the speed of the turbocharger via the electric machine.

10. The method of claim 9, wherein decreasing the speed of the turbocharger via the electric machine comprises increasing an amount of power generated by the electric machine.

11. The method of claim 9, wherein decreasing the speed of the turbocharger via the electric machine comprises decreasing an amount of power provided to the shaft by the electric machine.

12. The method of claim 5, wherein the exhaust gas temperature is determined based on an output of one or both of a first temperature sensor positioned at a turbine inlet of a turbine of the turbocharger and a second temperature sensor arranged at an inlet of an aftertreatment system positioned downstream of the turbine.

13. A method, comprising:
   at a first instance, operating an engine system with a speed of an electric turbocharger above a threshold speed and an exhaust gas temperature less than an upper threshold temperature;
   in response to the speed of the electric turbocharger being greater than the threshold speed while the exhaust gas temperature is less than the upper threshold temperature, reducing the speed of the electric turbocharger via an electric machine;
   at a second instance, operating the engine system with the exhaust gas temperature above the upper threshold temperature while the speed of the electric turbocharger is less than the threshold speed;
   in response to the exhaust gas temperature being greater than the upper threshold temperature while the speed of the electric turbocharger is less than the threshold speed, increasing the speed of the electric turbocharger via the electric machine;
   at a third instance, operating the engine system with the exhaust gas temperature above the upper threshold temperature while the speed of the electric turbocharger is greater than the threshold speed; and
   in response to the exhaust gas temperature being greater than the upper threshold temperature while the speed of the electric turbocharger is greater than the threshold speed, decreasing the exhaust gas temperature and the speed of the electric turbocharger by derating an engine of the engine system.

14. The method of claim 13, wherein reducing the speed of the electric turbocharger via the electric machine comprises at least one of increasing a first amount of energy extracted by the electric machine from a shaft of the electric turbocharger and decreasing a second amount of energy provided by the electric machine to the shaft of the electric turbocharger.

15. The method of claim 13, wherein increasing the speed of the electric turbocharger via the electric machine comprises at least one of decreasing a first amount of energy extracted by the electric machine from a shaft of the electric turbocharger and increasing a second amount of energy provided by the electric machine to the shaft of the electric turbocharger.

\* \* \* \* \*